US012392235B2

(12) United States Patent
Maus et al.

(10) Patent No.: US 12,392,235 B2
(45) Date of Patent: Aug. 19, 2025

(54) SYSTEM AND METHOD OF DRILLING A WELLBORE TO A TARGET

(71) Applicant: MAGNETIC VARIATION SERVICES LLC, Denver, CO (US)

(72) Inventors: Stefan Maus, Boulder, CO (US); Marc Ernest Willerth, San Luis Obispo, CA (US); Jarrod Shawn Deverse, Greenwood Village, CO (US)

(73) Assignee: MAGNETIC VARIATION SERVICES LLC, Denver, CO (US)

( * ) Notice: Subject to any disclaimer, the term of this patent is extended or adjusted under 35 U.S.C. 154(b) by 397 days.

(21) Appl. No.: 17/811,375

(22) Filed: Jul. 8, 2022

(65) Prior Publication Data
US 2022/0349296 A1 Nov. 3, 2022

Related U.S. Application Data

(63) Continuation of application No. 16/192,135, filed on Nov. 15, 2018, now Pat. No. 11,421,525, which is a continuation-in-part of application No. 16/097,788, filed as application No. PCT/US2017/032295 on May 11, 2017, now Pat. No. 11,473,420.
(Continued)

(51) Int. Cl.
| E21B 47/022 | (2012.01) |
| E21B 7/04 | (2006.01) |
| E21B 44/00 | (2006.01) |
| E21B 47/024 | (2006.01) |
| E21B 47/04 | (2012.01) |
| G01V 3/38 | (2006.01) |

(52) U.S. Cl.
CPC .............. *E21B 47/022* (2013.01); *E21B 7/04* (2013.01); *E21B 44/00* (2013.01); *E21B 47/024* (2013.01); *E21B 47/04* (2013.01); *G01V 3/38* (2013.01); *E21B 2200/20* (2020.05)

(58) Field of Classification Search
CPC ........ E21B 47/022; E21B 47/02; E21B 47/00; E21B 7/04; E21B 44/00; E21B 47/024; E21B 47/04; E21B 2200/20; E21B 2200/00; E21B 47/06; G01V 3/38; G01V 3/00
See application file for complete search history.

(56) References Cited

U.S. PATENT DOCUMENTS

| 6,405,808 B1 | 6/2002 | Edwards et al. |
| 7,957,946 B2 | 6/2011 | Pirovolou |

(Continued)

OTHER PUBLICATIONS

CA3022843 "Office Action", Aug. 9, 2023, 6 pages.
(Continued)

*Primary Examiner* — Mohamed Charioui
(74) *Attorney, Agent, or Firm* — Kilpatrick Townsend & Stockton LLP

(57) ABSTRACT

A system and method of drilling a wellbore to a target may include measuring attitudes at two adjacent survey stations along a wellbore using a downhole surveying tool. An actual change in wellbore position over a survey leg linking the two survey stations may be determined. Corrections may be applied to the measured attitude at one or both of the survey stations such that an estimated well path joining the survey stations indicates the determined actual change in wellbore position between the two survey stations.

12 Claims, 10 Drawing Sheets

Related U.S. Application Data

(60) Provisional application No. 62/408,622, filed on Oct. 14, 2016, provisional application No. 62/335,078, filed on May 12, 2016.

(56) References Cited

U.S. PATENT DOCUMENTS

| | | | |
|---|---|---|---|
| 8,561,720 | B2 | 10/2013 | Edbury et al. |
| 11,421,525 | B2 | 8/2022 | Maus et al. |
| 11,473,420 | B2 | 10/2022 | Maus et al. |
| 2002/0060570 | A1 | 5/2002 | Shirasaka et al. |
| 2009/0319241 | A1* | 12/2009 | Samuel ............... E21B 7/04 703/10 |
| 2012/0046865 | A1* | 2/2012 | Heisig ............... E21B 47/024 702/6 |
| 2012/0330551 | A1* | 12/2012 | Mitchell ............... E21B 47/022 702/9 |
| 2015/0240620 | A1* | 8/2015 | Bang ............... E21B 47/022 702/11 |
| 2015/0240622 | A1 | 8/2015 | Bang et al. |
| 2016/0032709 | A1* | 2/2016 | Ledroz ............... E21B 47/022 73/152.54 |
| 2016/0201449 | A1* | 7/2016 | Dirksen ............... E21B 7/10 702/9 |

OTHER PUBLICATIONS

U.S. Appl. No. 16/097,788, "Advisory Action", Jan. 25, 2022, 5 pages.
U.S. Appl. No. 16/097,788, "Final Office Action", Oct. 27, 2021, 23 pages.
U.S. Appl. No. 16/097,788, "Non-Final Office Action", Jun. 8, 2021, 20 pages.
U.S. Appl. No. 16/097,788, "Notice of Allowance", Mar. 24, 2022, 14 pages.
U.S. Appl. No. 16/192,135, "Corrected Notice of Allowability", May 4, 2022, 2 pages.
U.S. Appl. No. 16/192,135, "Non-Final Office Action", Oct. 28, 2021, 16 pages.
U.S. Appl. No. 16/192,135, "Notice of Allowance", Apr. 11, 2022, 10 pages.
Australian Patent Application No. 2017263539, "First Examination Report", Feb. 22, 2022, 3 pages.
CONC2018/0012148, "Office Action", Dec. 14, 2020, 20 pages.
European Patent Application No. 17796894.8, "Extended European Search Report", Jan. 27, 2020, 8 pages.
PCT/US2017/032295, "International Preliminary Report on Patentability", Nov. 22, 2018, 9 pages.
PCT/US2017/032295, "International Search Report and Written Opinion", Aug. 16, 2017, 9 pages.
U.S. Appl. No. 16/097,788, "Notice of Allowance", Jul. 27, 2022, 8 pages.
AU2017263539, "Notice of Acceptance", Nov. 21, 2022, 3 pages.
AU2017263539, "Second Examination Report", Sep. 5, 2022, 2 pages.
MX/A/2018/013666, "Office Action", Aug. 30, 2022, 4 pages.
CA3,022,843, "Office Action", Jun. 12, 2024, 6 pages.

\* cited by examiner

SYSTEM AND METHOD OF DRILLING A WELLBORE TO A TARGET

CROSS-REFERENCES TO RELATED APPLICATIONS

This application is a continuation of and claims the benefit of priority of U.S. patent application Ser. No. 16/192,135 filed on Nov. 15, 2018, entitled "SYSTEM AND METHOD OF DRILLING A WELLBORE TO A TARGET,", which is a continuation-in-part application of and claims the benefit of priority of U.S. patent application Ser. No. 16/097,788 filed on Oct. 30, 2018, entitled "METHOD OF DRILLING A WELLBORE TO A TARGET", which is a U.S. national phase application of and claims the benefit of priority of PCT application No. PCT/US2017/032295, filed on May 11, 2017, entitled "METHOD OF DRILLING A WELLBORE TO A TARGET", which claims the benefit of priority to U.S. Provisional Application No. 62/408,622, filed on 14 Oct. 2016, entitled "MEASUREMENT WHILE DRILLING METHOD", and U.S. Provisional Application No. 62/335,078, filed on 12 May 2016, entitled "METHOD FOR CORRECTING POSITIONAL OR VERTICAL DEPTH ERRORS IN DOWNHOLE DIRECTIONAL SURVEYS". Each of the foregoing applications are hereby incorporated by reference as if fully set forth herein in their entireties for all purposes.

BACKGROUND OF THE INVENTION

In wellbore placement by measurement-while-drilling (MWD), surveys of the inclination angle and azimuth angle are taken at regular intervals along the wellbore. Industry standards specify that a survey is taken at least every 100 feet. Commonly, a survey may be taken about every 90 feet, corresponding to the length of a "stand" consisting of three "singles" of drill pipe. In sections with strong curvature ("build-section"), it is common to take surveys for every single drill pipe (approx. 30 feet). The wellbore trajectory may then be computed by minimum curvature interpolation, which implicitly assumes a circular arc (constant radial arc) between any two adjacent survey stations. Since the true well path between adjacent survey stations may not be a circular arc, the actual change in position from one survey station to the next may be different from the positional change computed by minimum curvature. The problem of minimum curvature error may be a cause of considerable concern, because even small errors in vertical depth can lead to significant economic losses due to stranded hydrocarbon resources. To avoid such errors, methods are available to measure or estimate the direction of the wellbore in the intervals between MWD surveys.

One method used to identify wellbore trajectory between MWD surveys includes measuring the wellbore inclination angle or azimuth angle or both at many additional points between two stationary surveys, called "continuous survey" or "dynamic survey," which may use a higher sampling rate than the actual MWD survey stations. Continuous survey data may include inclination angle measurements or both inclination angle and azimuth angle measurements. The wellbore trajectory may then be computed by minimum curvature interpolation that assumes a circular arc between any two adjacent points. The more additional data points there are between the stationary surveys, the closer the two adjacent points, and the more accurate the computed wellbore trajectory between the adjacent points may be. However, the use of additional intermediate data points to facilitate better calculation of wellbore trajectory may introduce operational complications in many workflows that use directional survey data.

BRIEF SUMMARY OF THE INVENTION

In one aspect, a first method of drilling a wellbore to a target includes measuring attitudes at two adjacent survey stations along a wellbore using a downhole surveying tool. The first method may further include determining an actual change in wellbore position over a survey leg linking the two adjacent stations, and applying corrections to the measured attitude at one or both of the survey stations such that an estimated well path joining the survey stations indicates the actual change determined in the wellbore position over the survey leg. In the first method, the estimated well path joining the two survey stations may be a circular arc computed by a minimum curvature method.

In any of the disclosed embodiments of the first method, determining the actual change in wellbore position may further include determining the actual change using continuous survey measurements taken at least between the two adjacent survey stations during drilling of the wellbore.

In any of the disclosed embodiments of the first method, determining the actual change in wellbore position may further include determining the actual change using continuous inclination angle measurements taken at least between the two adjacent survey stations during drilling of the wellbore.

In any of the disclosed embodiments of the first method, determining the actual change in wellbore position may further include determining the actual change in wellbore position comprises determining the actual change using depths and toolface directions defining slide intervals during drilling of the wellbore.

In any of the disclosed embodiments of the first method, applying the corrections to the measured attitude may further include applying the corrections to an inclination angle component of the measured attitude.

In any of the disclosed embodiments of the first method, the estimated well path may be dependent on the attitudes at the two survey stations such that applying corrections to the measured attitude further includes applying corrections to the estimated well path.

In any of the disclosed embodiments, the first method may further include adjusting a trajectory of the wellbore using the corrected attitude and steering the wellbore using the adjusted trajectory.

In another aspect, a second method of drilling a wellbore to a target includes measuring attitudes at two adjacent survey stations along a wellbore using a downhole surveying tool. The second method may further include determining an actual change in wellbore position over a survey leg linking the two adjacent stations, and interpolating a notional survey station between the two adjacent survey stations, the interpolating further including computing an attitude of the notional survey station such that two estimated well paths linking the two adjacent survey stations and notional survey station indicate the determined actual change in wellbore position over the survey leg.

In any of the disclosed embodiments of the second method, determining the actual change in wellbore position may further include determining the actual change using continuous survey measurements taken at least between the two adjacent survey stations during drilling of the wellbore.

In any of the disclosed embodiments of the second method, determining the actual change in wellbore position may further include determining the actual change using continuous inclination angle measurements taken at least between the two adjacent survey stations during drilling of the wellbore.

In any of the disclosed embodiments of the second method, determining the actual change in wellbore position may further include determining the actual change using depths and toolface directions defining slide intervals during drilling of the wellbore.

In any of the disclosed embodiments of the second method, the two estimated well paths linking the two adjacent survey stations and notional survey station may be circular arcs computed by a minimum curvature method.

In yet another aspect, a third method of drilling a wellbore to a target includes measuring attitudes at least at two of consecutive first, second, and third survey stations along a wellbore using a downhole surveying tool. The third method may further include determining an actual change in wellbore position between the first and third survey stations, and applying corrections to the attitude at the second survey station such that two estimated well paths linking the three consecutive survey stations indicate the determined actual change in wellbore position between the first and third survey stations. In the third method, the two estimated well paths linking the three stations may be circular arcs computed by a minimum curvature method.

In any of the disclosed embodiments of the third method, determining the actual change in wellbore position may further include determining the actual change in wellbore position between the first and third survey stations using continuous survey measurements taken during drilling of the wellbore.

In any of the disclosed embodiments of the third method, determining the actual change in wellbore position may further include determining the actual change in wellbore position between the first and third survey stations using continuous inclination angle measurements taken during drilling of the wellbore.

In any of the disclosed embodiments of the third method, determining the actual change in wellbore position may further include determining the actual change in wellbore position between the first and third survey stations using depths and toolface directions defining slide intervals during drilling of the wellbore.

In any of the disclosed embodiments of the third method, the third survey station may be a notional survey station determined by projecting the path of the wellbore ahead of the second survey station.

In any of the disclosed embodiments of the third method, determining the actual change in wellbore position may further include determining the actual change in wellbore position between the second and third survey stations using survey data other than stationary survey measurements taken at the survey stations.

In any of the disclosed embodiments of the third method, determining the actual change in wellbore position may further include determining the actual change in wellbore position between the second and third survey stations using depths and toolface directions defining slide intervals during drilling of the wellbore.

In still a further aspect, a first system for drilling a wellbore to a target is disclosed. The first system may include a processor, and memory media accessible to the processor storing instructions executable by the processor. In the first system, the instructions may include instructions for measuring attitudes at two adjacent survey stations along a wellbore using a downhole surveying tool, determining an actual change in wellbore position over a survey leg linking the two survey stations, and applying corrections to the measured attitude at one or both of the survey stations and determining an estimated well path joining the adjacent survey stations. In the first system, the estimated well path may indicate the actual change determined in the wellbore position over the survey leg, while the estimated well path may be a circular arc computed by a minimum curvature method.

In any of the disclosed embodiments of the first system, determining the actual change in the wellbore position may further include determining the actual change using continuous survey measurements taken at least between the two adjacent survey stations during drilling of the wellbore.

In any of the disclosed embodiments of the first system, determining the actual change in the wellbore position may further include determining the actual change using continuous inclination angle measurements taken at least between the two adjacent survey stations during drilling of the wellbore.

In any of the disclosed embodiments of the first system, determining the actual change in the wellbore position may further include determining the actual change using depths and toolface directions defining slide intervals during drilling of the wellbore.

In any of the disclosed embodiments of the first system, the corrections may be applied to an inclination angle component of the measured attitude.

In any of the disclosed embodiments of the first system, the estimated well path may be dependent on the attitudes at the two survey stations, while applying the corrections to the measured attitude may further include applying corrections to the estimated well path.

In any of the disclosed embodiments, the first system may further include instruction for adjusting a trajectory of the wellbore using the corrected attitude and steering the wellbore using the adjusted trajectory.

In any of the disclosed embodiments, the first system may further include instruction for calculating at least one drilling parameter based on the estimated well path, and using the at least one drilling parameter calculated to control steering during drilling of the wellbore.

In yet a further aspect, a second system for drilling a wellbore to a target is disclosed. The second system may include a processor, and memory media accessible to the processor storing instructions executable by the processor. In the second system, the instructions may include instructions for measuring attitudes at two adjacent survey stations along a wellbore using a downhole surveying tool, determining an actual change in wellbore position over a survey leg linking the two adjacent survey stations, and interpolating a notional survey station between the two adjacent survey stations. In the second system, interpolating the notional survey station may further include computing an attitude of the notional survey station, while two estimated well paths linking the two adjacent survey stations to the notional survey station may indicate the determined actual change in wellbore position over the survey leg.

In any of the disclosed embodiments of the second system, determining the actual change in the wellbore position may further include determining the actual change using continuous survey measurements taken at least between the two adjacent survey stations during drilling of the wellbore.

In any of the disclosed embodiments of the second system, determining the actual change in the wellbore position may further include determining the actual change using continuous inclination angle measurements taken at least between the two adjacent survey stations during drilling of the wellbore.

In any of the disclosed embodiments of the second system, determining the actual change in the wellbore position may further include determining the actual change using depths and toolface directions defining slide intervals during drilling of the wellbore.

In any of the disclosed embodiments of the second system, the two estimated well paths may be circular arcs computed by a minimum curvature method.

In any of the disclosed embodiments, the second system may further include instructions for calculating at least one drilling parameter based on the two estimated well paths, and using the at least one drilling parameter calculated to control steering during drilling of the wellbore.

In yet another aspect, a third system for drilling a wellbore to a target is disclosed. The third system may include a processor, and memory media accessible to the processor storing instructions executable by the processor. In the third system, the instructions may include instructions for measuring attitudes at least at two of consecutive first, second, and third survey stations along a wellbore using a downhole surveying tool, determining an actual change in wellbore position between the first and third survey stations, and applying corrections to the attitude at the second survey station. In the third system, two estimated well paths linking the three consecutive survey stations may indicate the determined actual change in wellbore position between the first and third survey stations, while the two estimated well paths linking the three stations may be circular arcs computed by a minimum curvature method.

In any of the disclosed embodiments of the third system, determining the actual change in the wellbore position may further include determining the actual change in wellbore position between the first and third survey stations using continuous survey measurements taken during drilling of the wellbore.

In any of the disclosed embodiments of the third system, determining the actual change in the wellbore position may further include determining the actual change in wellbore position between the first and third survey stations using continuous inclination angle measurements taken during drilling of the wellbore.

In any of the disclosed embodiments of the third system, determining the actual change in the wellbore position may further include determining the actual change in wellbore position between the first and third survey stations using depths and toolface directions defining slide intervals during drilling of the wellbore.

In any of the disclosed embodiments of the third system, the third survey station may be a notional survey station determined by projecting the path of the wellbore ahead of the second survey station.

In any of the disclosed embodiments of the third system, determining the actual change in the wellbore position may further include determining the actual change in wellbore position between the second and third survey stations using survey data excluding stationary survey measurements taken at the survey stations.

In any of the disclosed embodiments of the third system, determining the actual change in the wellbore position may further include determining the actual change in wellbore position between the second and third survey stations using depths and toolface directions defining slide intervals during drilling of the wellbore.

In any of the disclosed embodiments, the third system may further include instruction for calculating at least one drilling parameter based on the two estimated well paths, and using the at least one drilling parameter calculated to control steering during drilling of the wellbore.

BRIEF DESCRIPTION OF THE DRAWINGS

The following is a description of the figures in the accompanying drawings. The figures are not necessarily to scale, and certain figures and certain views of the figures may be shown exaggerated in scale or in schematic in the interest of clarity and conciseness.

DETAILED DESCRIPTION OF THE INVENTION

Figure 1:
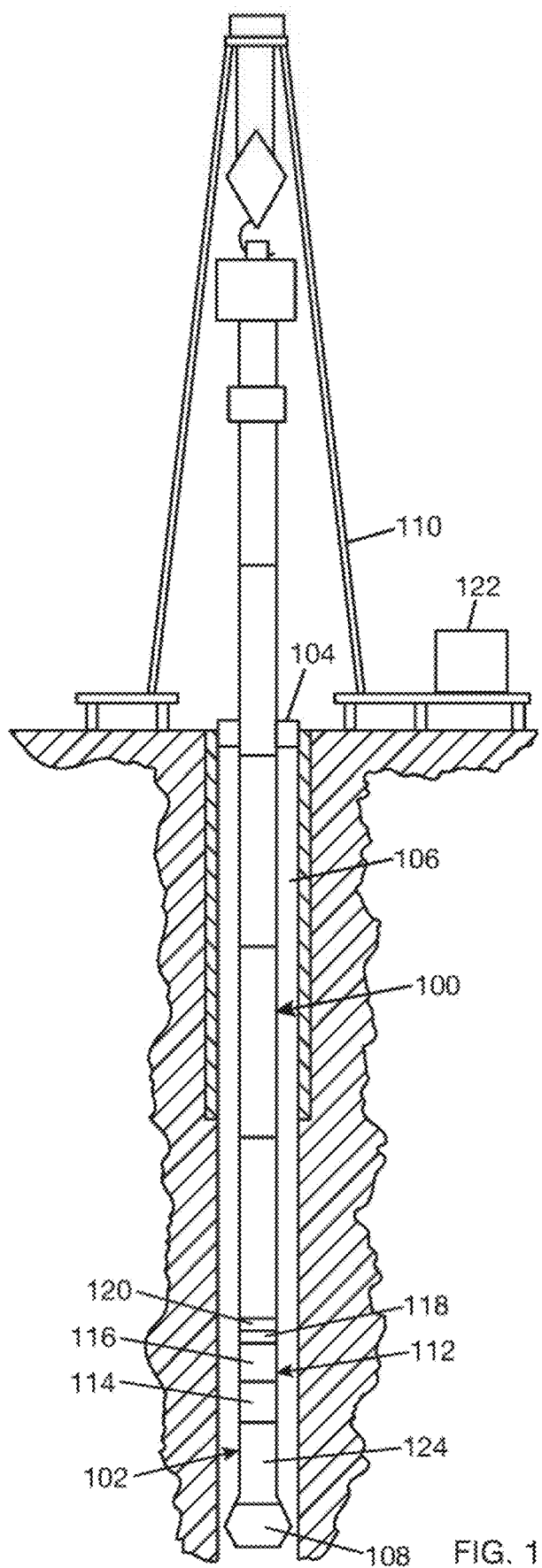
FIG. 1 shows a system for drilling a wellbore.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Measurement-while-drilling (MWD) survey stations are typically spaced about every 90 feet along the wellbore. Each MWD survey station is characterized by a measured depth, MD, inclination angle, Inc, and azimuth angle, Az. Inclination angle is the deviation of the wellbore from the vertical. Azimuth angle is the orientation of the wellbore relative to the north direction. Measured depth is the length of the wellbore. The survey data may be represented by a set of direction vectors D in a North-East-Vertical (NEV) coordinate system. Each direction vector D corresponds to a measured depth, MD, at a survey station and may be expressed as shown in Equation (1) below. (The direction vector D may also be described as the attitude of the corresponding survey station.)

$$D = |\sin(Inc)\cdot\cos(Az), \sin(Inc)\cdot\sin(Az), \cos(Inc)| \quad \text{(Equation 1)}$$

where:
Inc=inclination angle
Az=azimuth angle
D=direction vector or attitude

A common method for computing a well path is the minimum curvature method, which assumes a circular arc between any two adjacent survey stations with indices n−1 and n. The position coordinates of survey station n−1 are given or known. The position coordinates for survey station n, in terms of Easting, Northing, and True Vertical Depth, are calculated by fitting a circular arc to the two positional vectors corresponding to indices n−1 and n. If the well path between two adjacent survey stations n−1 and n is represented by position vectors $P_{n-1}$ and $P_n$, then Equations 2A, 2B, and 2C may be applied.

$$D_n = |\sin(Inc_n) \cdot \cos(Az_n), \sin(Inc_n) \cdot \sin(Az_n), \cos(Inc_n)| \quad \text{(Equation 2A)}$$

$$DL_n = \cos^{-1}(D_{n-1} \cdot D_n) \quad \text{(Equation 2B)}$$

$$P_n = P_{n-1} + (MD_n - MD_{n-1}) \cdot \tan\left(\frac{DL_n}{2}\right) \Big/ DL_n \cdot (D_{n-1} + D_n) \quad \text{(Equation 2C)}$$

where:
$D_{n-1}$=direction vector at survey station n−1
$D_n$=direction vector at survey station n
$DL_n$=dogleg angle between attitudes at survey stations n−1 and n
$MD_{n-1}$=measured depth at survey station n−1
$MD_n$=measured depth at survey station n
$P_{n-1}$=position vector at survey station n−1
$P_n$=position vector at survey station n In the case where $DL_n=0$, the expression $\tan(DL_n/2)/DL_n$ in Equation 2C is replaced by ½.

A standard minimum curvature solution assumes that the entire interval between survey stations n−1 and n will be drilled at a constant radius of curvature. In reality, drilling of the interval may not follow a circular arc. In reality, the true changes in inclination angle and azimuth angle may not be distributed along a circular arc over the survey interval between the two adjacent survey stations. As a result, the true change in position between the survey stations may be different from the change in position computed by the minimum curvature method (Equations 2A, 2B, and 2C). It is possible to estimate and correct this positional error using additional information on the wellbore trajectory between surveys, such as through continuous surveying or slide sheets. However, in order for such a correction to be operationally viable, the correction should fit within a standard wellbore surveying framework that employs minimum curvature representation of the wellbore trajectory.

In one embodiment of the present disclosure, a first method of correcting wellbore positional error includes applying corrections to the measured attitude at one or both of two adjacent survey stations such that an estimated well path joining the two survey stations describes the actual change in wellbore position (usually expressed in 3 coordinates, Northing, Easting, and True Vertical Depth) between the two adjacent survey stations. In a first example, let the two adjacent survey stations be a previous survey station, n−1, and a current survey station, n. As the terms "previous" and "current" are used, the previous survey station will have a smaller measured depth (MD) compared to the current survey station. For the first method, the position vector, $P_n$, at the current survey station may be estimated using additional survey information collected between the previous survey station, n−1, and the current survey station, n. Then, corrections to the attitude measured at the current survey station may be computed such that the minimum curvature solution matches the estimated position at the current survey station, n. The first method of correcting wellbore positional error, as disclosed herein, may be different from the standard minimum curvature computation using uncorrected survey data, where the attitude at the current survey station is matched but additional knowledge regarding the position of the current survey station is ignored.

Figure 4A:
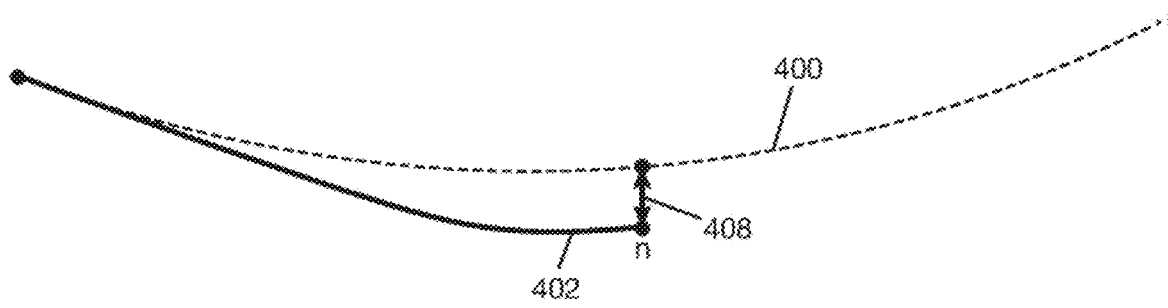
FIG. 4A illustrates minimum curvature solution with standard survey.

FIG. 4A illustrates a prior art minimum curvature solution with uncorrected survey 400. The actual well path is shown at 402. Note the error 408 in true vertical depth (TVD) between the trajectory computed by the standard minimum curvature solution 400 and the actual well path 402 at the current survey station, n.

Figure 4B:
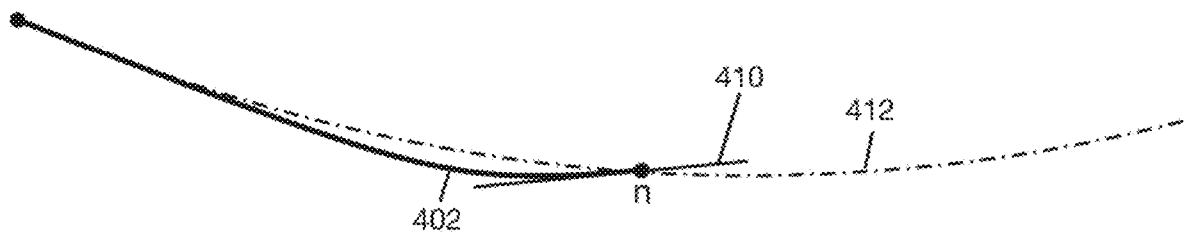
FIG. 4B illustrates minimum curvature solution with corrected survey.

FIG. 4B illustrates a minimum curvature solution with corrected survey 412, according to the present disclosure. The actual well path is shown at 402. Note that the corrected survey has eliminated the TVD error at the current survey station, n, with the position of the wellbore trajectory computed by the minimum curvature solution matching the position of the actual well path at the current survey station, n.

For the embodiment described above in FIG. 4B, the estimated well path linking the two adjacent survey stations is described by Equations 3A, 3B, and 3C. Equation 3A describes the direction vector, $D_n$, at the current survey station, n, with inclination angle correction, $\delta Inc_n$, to the inclination angle measured at the current survey station, n, and azimuth angle correction, $\delta Az_n$, to the azimuth angle measured at the current survey station, n. In alternate examples, the measured inclination angle or the measured azimuth angle may be corrected alone. The term "correction to attitude" is used herein to describe the correction to one or both of the measured inclination angle and the measured azimuth angle. The dogleg angle, $DL_n$, and position vector, $P_n$, at the current survey station are given by Equations 3B and 3C.

$$D_n = |\sin(Inc_n + \delta Inc_n) \cdot \cos(Az_n + \delta Az_n), \quad \text{(Equation 3A)}$$
$$\sin(Inc_n + \delta Inc_n) \cdot \sin(Az_n + \delta Az_n), \cos(Inc_n + \delta Inc_n)|$$

$$DL_n = \cos^{-1}(D_{n-1} \cdot D_n) \quad \text{(Equation 3B)}$$

$$P_n = P_{n-1} + (MD_n - MD_{n-1}) \cdot \tan\left(\frac{DL_n}{2}\right) \Big/ DL_n \cdot (D_{n-1} + D_n) \quad \text{(Equation 3C)}$$

where:
$Az_n$=azimuth angle at current survey station
$Inc_n$=inclination angle at current survey station
$\delta Inc_n$=correction to inclination angle at current survey station
$\delta Az_n$=correction to azimuth angle at current survey station
$D_{n-1}$=direction vector, or attitude, at the previous survey station
$D_n$=direction vector, or attitude, at the current survey station
$DL_n$=dogleg angle between attitudes at the two survey stations
$MD_{n-1}$=measured depth at the previous survey station
$MD_n$=measured depth at the current survey station
$P_{n-1}$=position vector at previous survey station
$P_n$=position vector at the current survey station In the correction in FIG. 4B, note that the well-path vector 410 is not tangent to curve 412 at station n, because the correction defines a new survey vector that is tangent to the desired curve, but is not necessarily aligned with the well path. Relaxing this tangent restriction enables proper placement of the well using the circular arc. However, there is value in having the well path aligned with the tangent lines of the estimated curve 412. The embodiments described below use dual arc optimization to align the well path with the tangent lines of the estimated curve 412.

In another embodiment of the present disclosure, a second method of correcting wellbore positional error includes applying corrections to the attitude at a notional station interpolated between two adjacent survey stations, such that two estimated well paths joining the notional station to each of the two adjacent survey stations describe the actual change in wellbore position between the two adjacent survey stations. For the second method, it may be helpful to consider the effect of interpolating a notional station between two adjacent survey stations (i.e., a previous survey station, n−1, and a current survey station, n) and estimating the interval between the two adjacent survey stations as two circular arcs. When the attitude of the interpolated notional station matches the attitude of the single circular arc linking the two adjacent survey stations, then a final position computed as two circular arcs may remain unchanged. When the attitude of the interpolated notional station is changed slightly up or down, left or right, then the final position of the current survey station, n, computed from two circular arcs, may move in the same direction as the attitude. Thus, by selecting a correct attitude for the interpolated notional station, the position of the current survey station, n, as computed by two circular arcs, may closely match the estimated position at the current survey station, n. Similar to the first method, in the second method, the position vector, $P_n$, at the current survey station, n, can be estimated using additional survey information collected between the previous survey station, n−1, and the current survey station, n.

Figure 5:
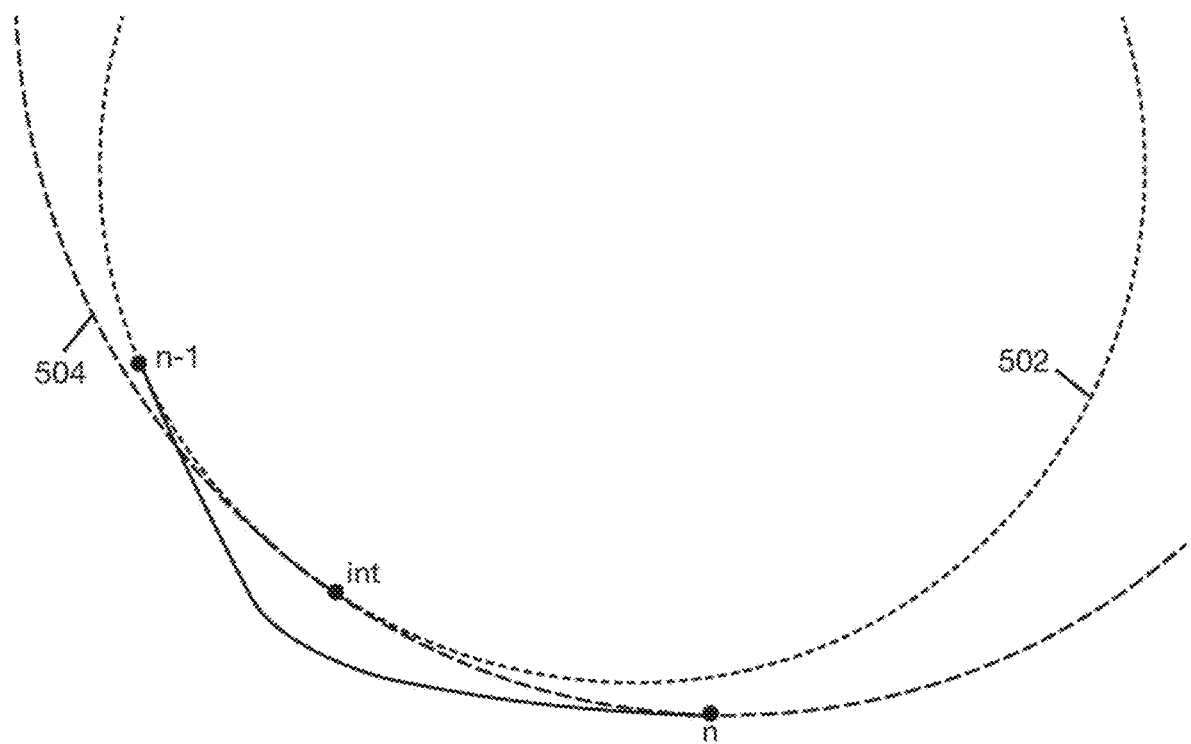
FIG. 5 illustrates a notional station interpolated between a previous and a current survey station.

For illustration purposes, FIG. 5 shows an example of a notional station, int, interpolated between two adjacent survey stations, n−1 and n. In FIG. 5, a curve 504 is tangent to (or defined by) the tangent lines defined by survey vectors (D) at stations int and n, and curve 502 is tangent to (or defined by) the tangent lines defined by survey vectors at stations int and n−1.

Suppose that the notional station, int, interpolated between two adjacent survey stations is at a measured depth MD int with attitude $D_{int}$, then the two circular arcs (e.g., 502, 504 in FIG. 5) joining the adjacent survey stations to the notional station may be solved using Equations 4A, 4B, and 4C.

$$DL_1 = \cos^{-1}(D_{n-1} \cdot D_{int}) \quad \text{(Equation 4A)}$$

$$DL_2 = \cos^{-1}(D_{int} \cdot D_n) \quad \text{(Equation 4B)}$$

$$P_n = P_{n-1} + (MD_{int} - MD_{n-1}) \cdot \frac{\tan\left(\frac{DL_1}{2}\right)}{DL_1} \cdot (D_{n-1} + D_{int}) + \quad \text{(Equation 4C)}$$

$$(MD_n - MD_{int}) \cdot \frac{\tan\left(\frac{DL_2}{2}\right)}{DL_2} \cdot (D_{int} + D_n) + \Delta MD \cdot D_n$$

where:
$DL_1$=dogleg angle between attitudes at the previous survey station and notional station
$DL_2$=dogleg angle between attitudes at the notional station and current survey station
$D_{n-1}$=direction vector, or attitude, at the previous survey station
$D_{int}$=direction vector, or attitude, at the notional station
$D_n$=direction vector, or attitude, at the current survey station
$MD_{n-1}$=measured depth at the previous survey station
$MD_{int}$=measured depth at the notional station
$MD_n$=measured depth at the current survey station
$\Delta MD$=residual error in along-hole depth
$P_{n-1}$=position vector at previous survey station
$P_n$=position vector at the current survey station Since Equation 4C is in vector form, Equations 4A, 4B, and 4C can be solved for $\Delta MD$ and $D_{int}$. $D_{int}$ is a unit vector with only two independent unknowns, which can alternately be represented as $Inc_{int}$ and $Az_{int}$. The position of $MD_{int}$ may be selected to be midway between $MD_{n-1}$ and $MD_n$, in order to minimize the curvatures of the segments. In certain embodiments, the calculations can be made simpler and a non-iterative solution can be found, without significantly degrading accuracy, by replacing each of the two expressions $\tan(DL_x/2)/DL$ with the constant ½.

The second method as described above may be used if it is acceptable to add interpolated stations to the survey data or if it is acceptable to adjust the attitudes of alternate survey stations. However, more commonly a preferred solution adjusts the attitude of each survey station in real time without adding additional stations.

In another embodiment of the present disclosure, a third method of correcting wellbore positional error includes estimating the interval between three consecutive survey stations—a first station, n−1, a second station, n, and a third station, n+1 (where $MD_{n-1} < MD_n < MD_{n+1}$)—as two circular arcs, and applying corrections to the attitude of the second station, n, such that the two circular arcs describe an actual change in wellbore position between the first station, n−1, and the third station, n+1. In one example, the stationary surveys at the three stations may be available, and the corrections to the second station may be determined using a procedure similar to the second method described above for the interpolated notional station. In the third method, the second station may correspond to the interpolated notional station, the first station may correspond to the previous station before the interpolated notional station, and the third station may correspond to the current station after the interpolated notational station. In another example, a calculation is made with knowledge of the well path prior to the second (or current) station, n, to be adjusted, but without knowledge of the third (or next) station, n+1. A solution may therefore be found by projecting the well path ahead to a notional station described by $D_{n+1}$ and $P_{n+1}$ in Equations 5A and 5B, respectively, and adjusting the directional vector $D_n$ using the second method over the three stations at n−1, n, and n+1. It is noted that Equation 5A sets the directional vector at the notional station (or third station), n+1, to be the same as the directional vector at the second station, n. In other examples, a different relationship between the directional vector at the notional (third) station and the second station may be used.

$$D_{n+1} = D_n \quad \text{(Equation 5A)}$$

$$P_{n+1} = P_n + (MD_n - MD_{n-1}) \cdot D_n \quad \text{(Equation 5B)}$$

where:
$D_{n+1}$=direction vector, or attitude, at the notional, or third, station $D_n$=direction vector, or attitude, at the second, or current, station
$P_n$=position vector at the second, or current, station
$P_{n+1}$=position vector at the notional, or third, station
$MD_n$=measured depth at the second, or current, station
$MD_{n+1}$=measured depth at the first, or previous, station In the third method, without knowledge of the third (or next) station, corrections may be applied to the current survey such that corrections for future surveys are minimized. In this case, the distance of the wellbore ahead of the second station, n, may not have been surveyed yet, but it may be possible to estimate the position of the next station (or third station) using secondary data. The secondary data may include supplemental information that is outside of the stationary survey data, such as information from a qualitative orientation tool or sensor placed near the bit or information about how the well was directionally controlled during the drilling (e.g., depths and toolface directions information from slide sheets). The supplemental information may be usable to create a more stable correction at the current station. Thus station "n−1" is the previous (or first) survey station (used for the beginning of the traditional minimum curvature calculation), station "n" is the current (or second) survey station (used as the end point for traditional minimum curvature), and station "n+1" is next (or third) survey station in the future whose position may be estimated. By incorporating this supplemental information into the solution used at the second (or current) survey station, n, an amount of correction that is indicated when the drill bit drills far enough to allow a stationary survey to be taken at the next survey station (n+1) can be reduced. Once the position of the notional future survey station (n+1) has been estimated, then the minimum curvature solution will be similar to the third method with three stations.

Figure 6:
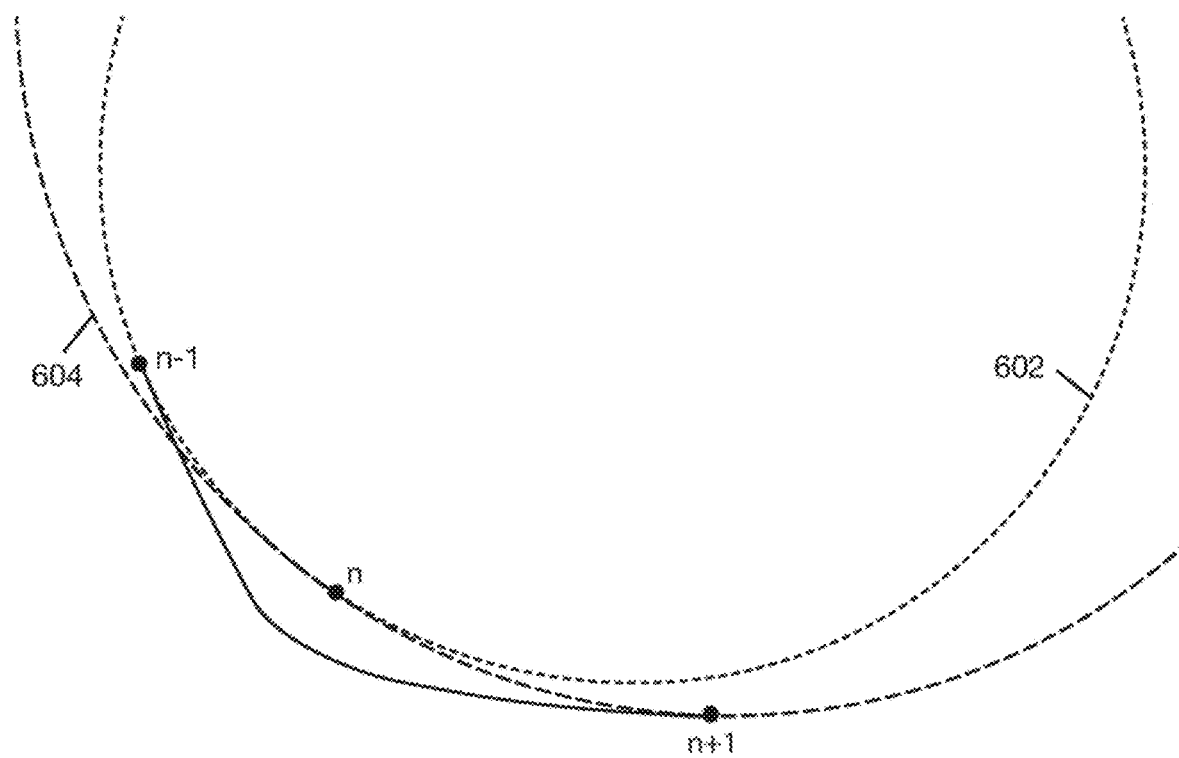
FIG. 6 illustrates a notional station projected ahead of a current survey station.

For illustration purposes, FIG. 6 shows a third station, n+1, projected ahead of a second (or current) station, n. An attitude of the second station, n, has been corrected such that the circular arcs (602, 604) linking the second station to the first (or previous) station, n−1, and third station, n+1, indicate an estimated actual change in wellbore position between the first and third stations. In FIG. 6, curve 604 is tangent to (or defined by) the tangent lines defined by survey vectors (D) at stations n and n+1, and curve 602 is tangent to (or defined by) the tangent lines defined by survey vectors (D) at stations at n−1 and n.

FIG. 1 shows an example of a drilling environment in which the embodiments described above may be used. In the example drilling environment, a drill string 100 including a bottom hole assembly (BHA) 102 is inserted through a wellhead 104 into a wellbore 106. The drill string 100 may be supported by a derrick assembly 110. The BHA 102 includes a drill bit 108 for drilling the wellbore 106. In one embodiment, the BHA 102 further includes a measurements section 112, which includes sensors and other equipment for making survey measurements from the wellbore 106. In one example, the measurements section 112 may include one or more downhole surveying tools, such as MWD module 114 and logging-while-drilling (LWD) module 116. The measurements section 112 may further include an electronics module 118, which may include a processor and other related computing devices for processing and applying corrections to survey data downhole and storing data. The measurements section 112 may include a communications module 120 for transmitting corrected or uncorrected survey data to a recording unit 122 at the surface. The recording unit 122 may be connected to appropriate computing facilities at the surface that allow processing of survey data received from the measurements section 112. The electronics module 118 and communications module 120 may be integrated into any or both of the measurement modules 114, 116. The BHA 102 may include other tools for directional drilling, such as a rotary steerable system (RSS) 124. The RSS 124 may also include devices for making downhole measurements.

In accordance with the present disclosure, methods of drilling a wellbore, such as wellbore 106, to a target involve making survey measurements along the wellbore. The survey measurements may be made using MWD or LWD. The methods may start at any point in the wellbore with a known position and a known (or assumed) orientation. For example, the starting point could be at the wellhead, or at a kickoff point (i.e., where deflection of the wellbore from the vertical starts) or at the bottom of a casing in the wellbore, or at any other desired point in the wellbore with a known position.

Figure 2:
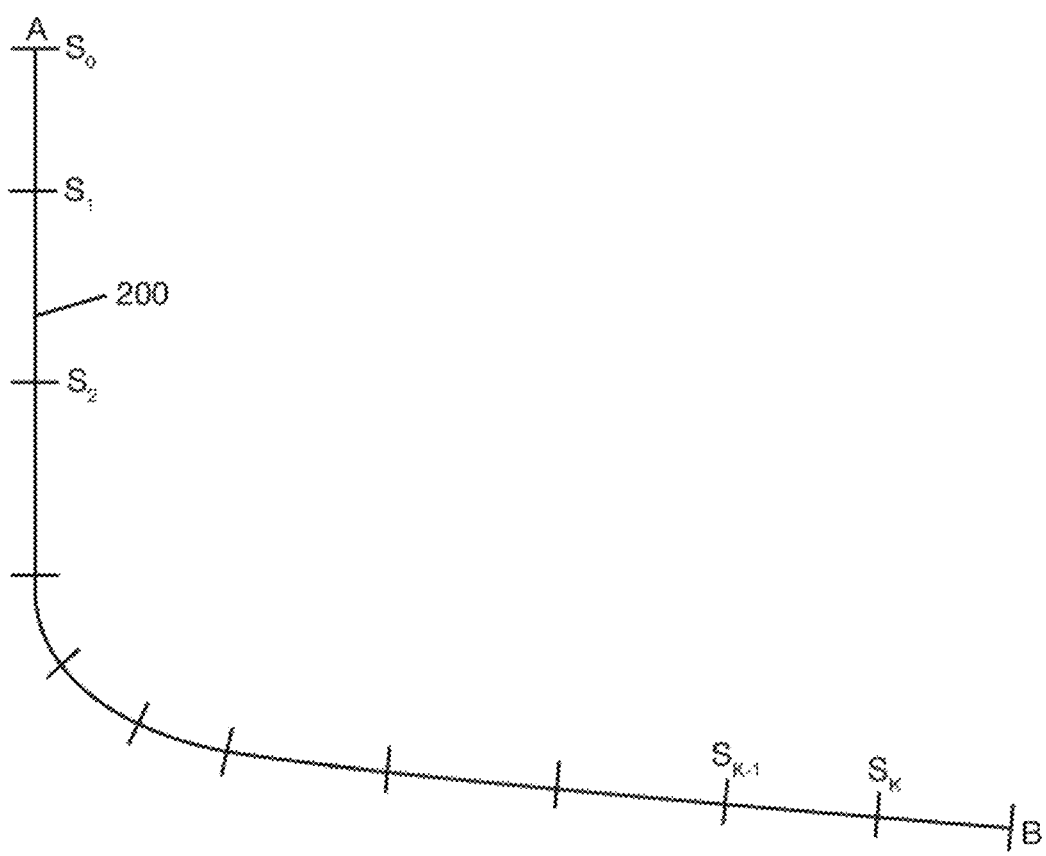
FIG. 2 shows a well path with survey stations.

For illustration purposes, FIG. 2 shows an example well path 200 from a wellhead A to a target B. The starting point, So, for surveys may be at the wellhead A or at another point along the well path. Subsequent survey stations, $S_1$, $S_2, \ldots, S_{k-1}, S_k$, are shown located along the well path. The number of survey stations between the starting point, So, and the target B may depend on the length of the wellbore between So and B. The spacing between the survey stations may be around 90 feet (e.g., corresponding to the length of three drill pipes), but may be as small as 30 feet (e.g., corresponding to the length of a single drill pipe) in sections of the well path with strong curvature. The spacing between the survey stations may be coordinated with the length of the drill pipe because stationary surveys can be taken when drilling is paused to allow addition of drill pipes to the drill string in the wellbore. Also, stationary surveys are typically less noisy than surveys taken while drilling is being performed. The methods may include drilling from one survey station to the next and making a measurement at each survey station after such drilling. The methods may also include making additional survey measurements while drilling from one survey station to the next. The methods may include modifying the measured attitudes at survey stations to ensure that estimated well paths between adjacent survey stations indicate true change in wellbore position between the adjacent survey stations, as described above. The methods, as described herein, may enable positional accuracy equivalent to positional accuracy achievable by high-accuracy methods, such as described in the background, without integrating numerous additional data into the survey record. The corrected attitudes may be used to define the trajectory of the wellbore and enable accurate steering of the wellbore to the target. Alternately, the corrected attitudes may be used for characterizing the well path after drilling.

Figure 3A:
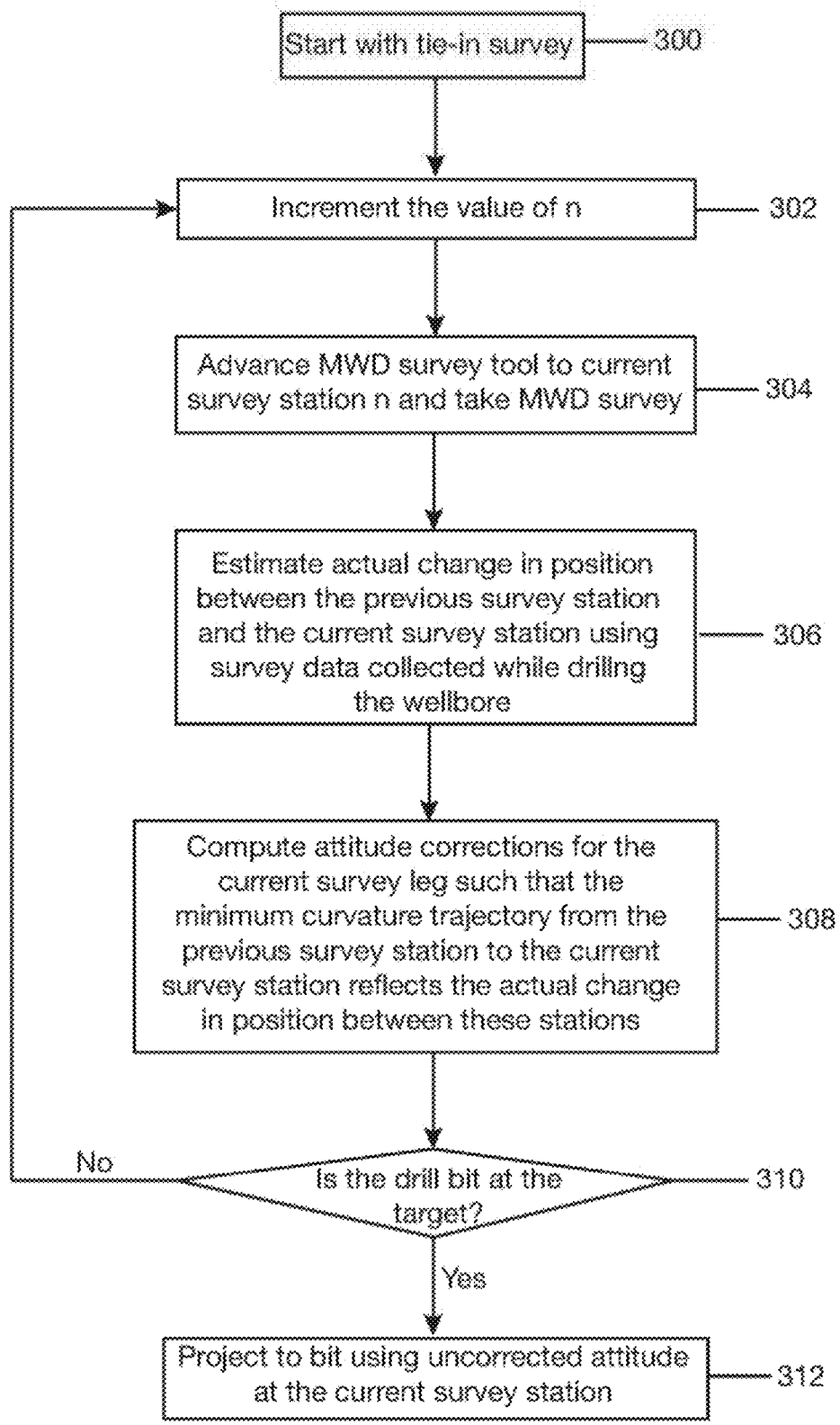
FIG. 3A is a flowchart illustrating a method of drilling a wellbore to a target, according to one embodiment.

FIG. 3A is a flowchart illustrating one practical implementation of the first method of drilling to a target according to the present disclosure. Variations to the first method in FIG. 3A are possible depending on the wellbore positional error correction method used. It is noted that various operations described in FIG. 3A may be omitted or rearranged in different embodiments.

In FIG. 3A, the first method may start at 300 at any point in the wellbore with a known position and a known (or assumed orientation). A known point from which the first method begins is the tie-in survey. The first method may use an index n to keep track of the current survey station. In step 302, the index n is incremented by 1, and a downhole surveying tool (e.g., MWD module 114 in FIG. 1) advances to the next survey station along the wellbore. In one embodiment, advancing the downhole surveying tool to the next survey station may involve drilling the wellbore to the next survey station. In step 304, a new survey measurement is made at the current survey station n using the downhole surveying tool. In step 306, an actual change in position between the previous survey station, n−1, and the current survey station, n, is estimated using survey information available between the previous survey station and the current survey station. Examples of how the actual change can be estimated in step 306 are described in further detail below. In step 308, attitude corrections for the current survey leg are computed such that the minimum curvature trajectory from the previous survey station n−1 to the current survey station n describes the actual change in wellbore position between the two stations. In general, any of the wellbore positional error correction methods described above may be used.

Figure 3B:
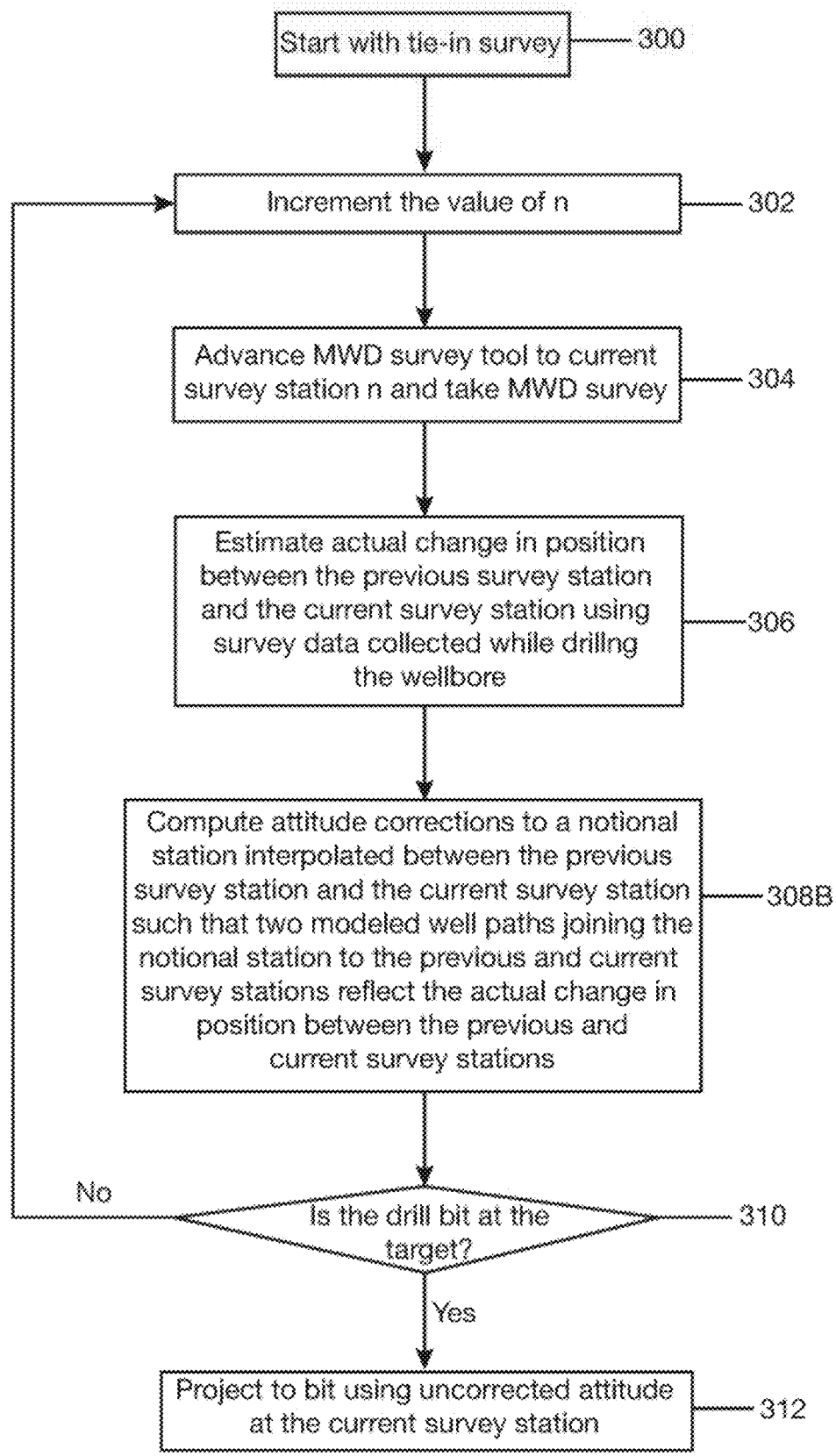
FIG. 3B is a flowchart illustrating a method of drilling a wellbore to a target, according to another embodiment.
Figure 3C:
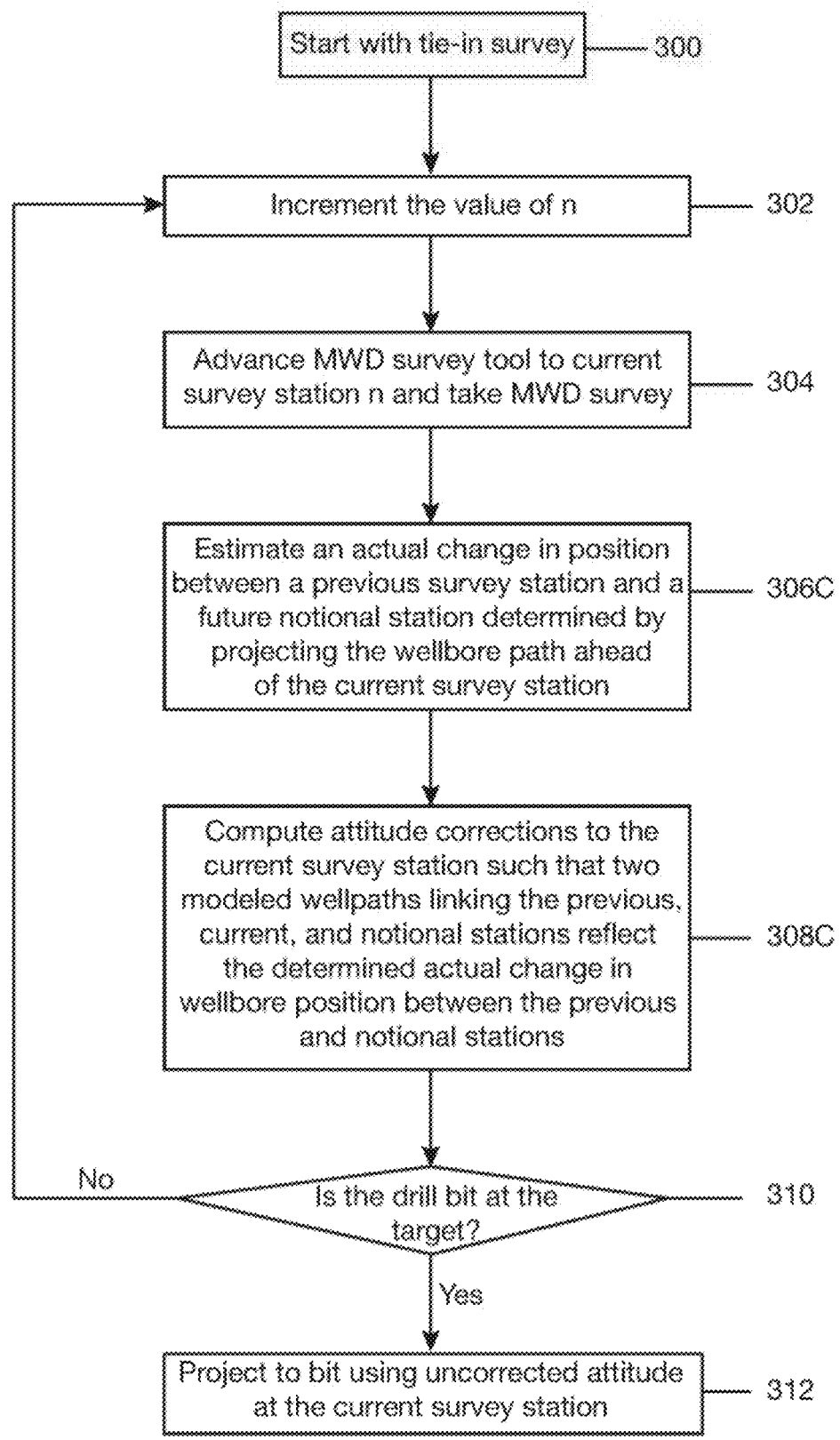
FIG. 3C is a flowchart illustrating a method of drilling a wellbore to a target, according to another embodiment.

FIGS. 3B and 3C show examples of variations to the first method shown in FIG. 3A, such as described above for the second method and the third method. In FIG. 3B, step 308B (corresponding to step 308 in FIG. 3A) is based on applying corrections to a notional station interpolated between two survey stations, as in the second method. In FIG. 3C, step 308C (corresponding to step 308 in FIG. 3A) is based on applying corrections to the current survey station taking into account a future survey station, and the preceding step 306C (corresponding to step 306 in FIG. 3A) involves estimating an actual change in position between the previous station and a future notional station determined by projecting the wellbore path ahead of the current survey station, as in the third method.

In another embodiment (not shown in the drawings) step 304 may be repeated such that three actual surveys are available as input for the wellbore positional error correction method in step 308C. In other words, instead of using a future notional station, an actual third station where a survey measurement is taken using a downhole surveying tool may be used.

Returning to FIG. 3A, in step 310, the position of the current survey station, n, is compared to the target to see if the drill bit is at the target. If the drill bit is not at the target at step 310, the method loops back to step 302. In one embodiment, before looping back to step 302, steering parameters for a wellbore section to be drilled may be determined using the corrected attitudes from step 308. As mentioned above, step 302 may involve drilling the wellbore to the next survey station. The corrected attitudes of step 308 may be used to determine a wellbore trajectory that accounts for actual change in wellbore position between survey stations, which can be used to make steering decisions while drilling the wellbore to the next survey station according to step 302. On the other hand, if the drill bit is at the target at step 310, the corrected projection to bit (i.e., corrected distance to drill the bit from the current survey station) may is computed at 312. The corrected projection to bit, $P_{bit}$, from the current survey station, n, can be computed by extrapolation using Equation 6.

$$P_{bit} = P_n + DTB \cdot D_n \quad \text{(Equation 6)}$$

where:
 $P_{bit}$=corrected projection to bit
 $P_n$=position vector at the current survey station n
 DTB=distance from the surveying tool to the front of the drill bit
 $D_n$=direction vector, or attitude, at the current survey station The correction to bit may be used to estimate the position of the borehole that has been drilled but where no survey measurements may be available. Due to the presence of other drilling tools in the wellbore, the surveying instrument may not reach to the bottom of the wellbore. Therefore, an estimation may be used for the orientation of the final segment of the wellbore.

Determining Actual Change in Position Using Continuous Survey Data Method

According to one embodiment, the actual change in position from the previous survey station to the current survey station, n, in step 306 may be estimated from continuous survey measurements. The continuous survey measurements are taken while drilling from the previous survey station, n−1, to the current survey station, n. As used herein "continuous" refers to a higher sampling rate than provided by actual survey stations or to providing additional survey data points between the survey stations. The continuous survey is separate from the stationary (or static) survey measurements that are made at survey stations (step 304). The continuous survey measurements typically include measured depth, inclination angle, and azimuth angle data. The capability to make the continuous survey measurements may be provided by any suitable tool, such as a continuous inclination angle survey tool, in the BHA.

For each survey interval from the previous survey station, n−1, to the current survey station, n, the following information may be used: continuous inclination angle and azimuth angle sequence $D(md_m)$, where $MD_{n-1} \leq md_m \leq MD_n$, for m=[1 . . . M], where MD is measurement depth. To compute the actual change in wellbore position, outliers from the M values of $D(md_m)$ may be removed. Data outliers can be removed by low-pass filtering, resampling, spline fitting, or by other means to reduce spurious data points. Then, the corresponding change in position from the previous station, n−1, to the current station, n, may be computed, and denoted as $(P_n - P_{n-1})$.

Pre-Processing of Continuous Survey Data: It is noted that the continuous survey data may be subject to additional error sources not present in stationary MWD survey. Vibration during the drilling process may introduce noise to the measurement. In extreme cases, drilling tools such as agitators may be used that intentionally induce axial vibrations by converting energy from mud flow into linear motion. Single sensor readings may have increased susceptibility to residual calibration errors on the sensor being used for inclination angle measurements, as well as potential biases from assumed values of total gravity references. Such error sources may cause discrepancies between the static MWD surveys and the continuous inclination angle sequence. To enable accurate estimation of the actual change in position between two adjacent stations, the continuous inclination angle data may be processed prior to use in the correction method described above, so that the benefits of including additional curvature in the survey are not outweighed by the detriments of including poor quality data. In various embodiments, pre-processing of continuous survey data (measured depth, inclination angle, azimuth angle) may include data conditioning, applying adjustments to the depth data, and applying adjustments to the continuous orientation data.

Data Conditioning: In some embodiments, statistical outliers may be removed from the continuous survey dataset. Noise-reduction functions may also be applied to the dataset and may include applying a smoothing function, resampling the data at a more convenient rate for analysis, or creating synthetic data (such as interpolated data). The output of data conditioning may be a new continuous survey dataset (of the form measured depth, inclination angle, and azimuth angle) that is more amenable to survey analysis, or that generates more reliable survey analyses.

Adjusting Depth Data: The measured depth data may be adjusted to better correlate with the stationary survey depths. The depth data adjustment may include evaluating drilling parameters that can correlate sensor depth to survey depths (such as bit depth, pump pressure, block position, and slide-rotate patterns), and may include analyzing residuals that result when subtracting the stationary survey data from the continuous survey data. The depth data adjustments may be made across the entire dataset or across smaller subsets of the dataset as small as a single point.

Adjusting Continuous Orientation Data: The continuous orientation data (inclination angle and azimuth angle) may be adjusted to better correlate with the stationary survey depths. Where discrepancies exist, the stationary survey may be assumed to be of superior quality (or greater reliability) than the continuous data. For inclination angle, adjusting continuous orientation data may include calculating an offset across the whole set of data or calculating multiple offsets to be applied to subsets of data as small as individual points. For azimuth angle data, the same operations and methods that are applied to the inclination angle data may be applied to the azimuth angle data. Alternatively, the azimuth angle data may be replaced (or augmented) by generating interpolated azimuth angle data from the stationary survey set.

Determining Actual Change in Position Between Stations Using Slide Sheet Method

A significant source of true vertical depth (TVD) errors may be due to the use of mud motors in directional drilling. Mud motors make use of a bend in the BHA. Consider a bend that causes a wellbore curvature of 5 degrees per 100 feet. If the drill string is rotated, the bend rotates in all directions, resulting in a straight hole or a small curvature in a direction which results from gravity and the BHA design. If on the other hand the drill string does not rotate, but the motor is driven by the mud flow, this results in a curve of 5 degrees per 100 feet (also referred to as a "slide"). By setting the orientation ("toolface") of the bend, the curvature of the wellbore can be oriented in the desired direction. In practice, the wellbore may be considered a sequence of "rotate" sections in which the direction is constant or slightly curved in a fixed direction and curved "slide" sections in which the direction changes in the direction of the toolface setting. The alternating slide and rotate sections may not be accounted for in the prior art minimum curvature representation of the wellbore trajectory.

According to the present disclosure, in another embodiment, for step 306, the actual change in position from the previous survey station, n−1, to the current survey station, n, may be computed from slide sheets. A slide sheet is a record of whether the well was intentionally deviated ("sliding" with a motor) or whether the well was drilled under the assumption that the path would be straight (rotary drilling). By using a record of the intended steering directions, the curvature of the wellbore between the stationary survey stations can be estimated.

For each survey interval from the previous survey station, n−1, to the current survey station, n, the following information from the slide sheets may be used: (1) "Slide" or "Rotate" mode for each segment of the interval drilled in a single mode; (2) the measured depths at each of the M switch-overs between slide and rotate segments for the interval, $MD_{n-1} \leq md_m \leq MD_n$, for m=[1 . . . M], and (3) the toolface reported for each "Slide" segment.

To compute the actual change in position, each sliding or rotating segment may be estimated by a circular arc. Each circular arc may, in turn, be defined by a starting depth $MD_{m-1}$ and an ending depths $MD_m$, starting attitude $D_{m-1}$, starting toolface direction $T_{m-1}$, and rate of curvature $C_m$. The ending attitude of a segment $D_m$ can be computed from Equations 7A, 7B, and 7C. The final direction vector $D_m$ may be found by rotation of the initial wellbore vector $D_{m-1}$ and unit vector $Y_{m-1}$ about the pole by angle $R_m$.

$$R_m = C_m \cdot (md_m - md_{m-1}) \quad \text{(Equation 7A)}$$

$$Y_{m-1} = |\cos(I_{m-1}) \cdot \cos(A_{m-1}) \cdot \cos(T_{m-1}) - \sin(A_{m-1}) \cdot \sin(T_{m-1}), \cos(I_{m-1}) \cdot \sin(A_{m-1}) \cdot \cos(T_{m-1}) + \cos(A_{m-1}) \cdot \sin(T_{m-1}), -\sin(I_{m-1}) \cdot \cos(T_{m-1})| \quad \text{(Equation 7B)}$$

$$D_m = D_{m-1} \cdot \cos(R_m) + Y_{m-1} \cdot \sin(R_m) \quad \text{(Equation 7C)}$$

where:
  $R_m$=rotation angle
  $C_m$=rate of curvature
  $md_m$=ending measured depth
  $md_{m-1}$=starting measured depth
  $Y_{m-1}$=unit vector normal to the initial wellbore vector Dm−1 and normal to the pole about which the wellbore interval curves
  $I_{m-1}$=Starting inclination angle
  $A_{m-1}$=Starting azimuth angle
  $T_{m-1}$=starting toolface direction
  $D_m$=ending attitude of a segment
  $D_{m-1}$=starting attitude of a segment Given values for each of the parameters shown above for Equations 7A, 7B, and 7C, final direction vectors can be found for all of the segments within an interval by solving sequentially from the first segment to the last. Final position vectors $P_m$ can be obtained by solving the circular arc formulas for each segment, the last such vector giving the current position $P_n$ at the end of the interval.

Several different computation modes may be employed, depending on the nature of the survey interval.

Sliding Segments Only Mode: If the survey interval consists of a number of sliding segments but no rotating segments, all of the depths and toolfaces may be obtained from slide sheet data. One remaining unknown may be the rate of curvature $C_M$, which can be assumed to be the same during each sliding segment. For any curvature value $C_M$, a solution can be found for the final attitude vector of the interval $D_M$. The curvature value $C_M$ that results in a final attitude vector closest to the measured attitude $D_n$ at the end of the interval is taken to be the solution. The optimum value for $C_M$ may be found by methods known in the art, such as Newton-Raphson iteration.

Sliding and Rotating Segments Mode: If the survey interval contains both sliding and rotating segments, the curvatures of each mode are unknown. It may be assumed that all sliding segments have the same curvature $C_S$, and all rotating segments have the same curvature $C_R$. If the rotating segments are assumed to have toolface zero (rotating mode curvature is restricted to the vertical plane), the optimum values of $C_S$ and $C_R$ may exactly match the final attitude. In this case the sliding mode curvature $C_S$ may match the left/right deviation in the horizontal plane, while the rotating mode curvature $C_R$ may match the residual up/down deviation in the vertical plane. As the computation is non-linear, iterative methods may be used to find a solution.

If the rotating mode segments are allowed to deviate out of vertical, then the rotating mode toolface $T_R$ may represent a third unknown. In this case, data from a single interval or stand, as the final measured attitude, provides two independent equations, and the rotating mode toolface $T_R$ can be solved using data from the current interval and the previous interval, by finding the parameters that best fit to both measured attitudes $D_{n-1}$ and $D_n$.

For actively controlled steering tools that generate different curvatures in different segments within one interval, the ratio of segment curvatures can be provided (e.g., one segment at 50% and another at 100%).

There may be certain limitations to these techniques. If all sliding toolfaces and rotating toolface coincide, it may not be possible to find a unique solution. Under these circumstances one additional piece of information can be provided, such as either the sliding or rotating curvature.

It should be noted that slide sheets report one toolface per segment. A segment drilled with constant toolface may not generally follow a circular arc. However, the methods described above describe each segment as a circular arc defined by an initial toolface direction. In order to limit systematic errors, the toolface direction reported on the slide sheet can be assigned to the midpoint of the corresponding circular arc, and then a starting toolface for use in the above calculations may be calculated.

Figure 7:
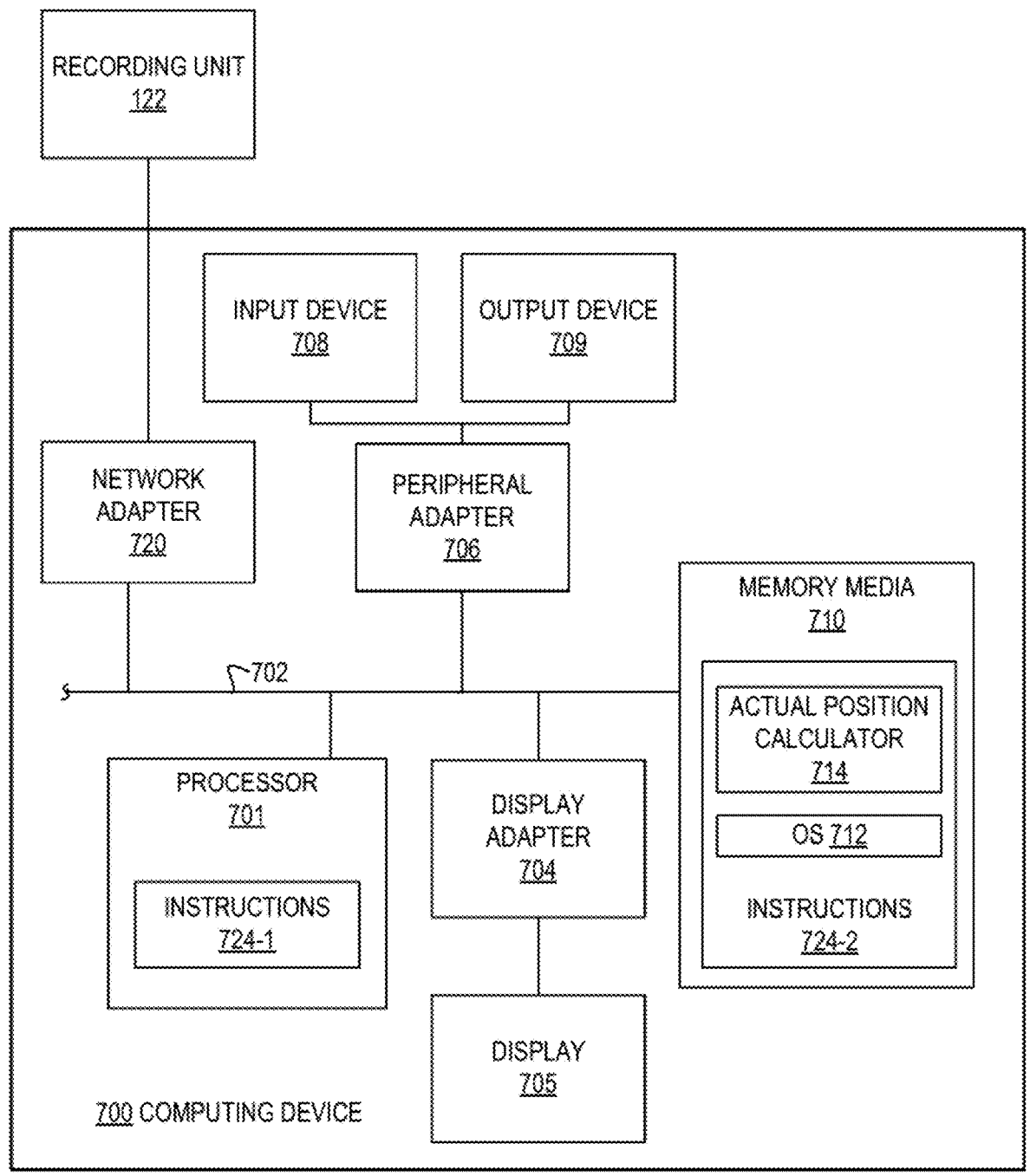
FIG. 7 illustrates a computing device enabled for actual position calculation.

Referring now to FIG. 7, a block diagram illustrates selected elements of an embodiment of a computing device 700 for determining actual change in position according to the present disclosure. In various embodiments, computing device 700 may represent an implementation of computing facilities at the surface that allow processing of survey data received from the measurements section 112, as disclosed herein. Accordingly, computing device 700 is shown with a network connection via a network adapter 720 to recording unit 122, as described above. It is noted that, in certain embodiments, computing device 700 may be operated without peripheral adapter 706 and without display 705 in a so-called "embedded" implementation that may represent at least one of electronics module 118 and communications module 120 (see FIG. 1) and that is suitable for downhole operation.

In the embodiment depicted in FIG. 7, computing device 700 includes processor 701 coupled via shared bus 702 to storage media collectively identified as memory media 710. Computing device 700, as depicted in FIG. 7, further includes network adapter 720 that interfaces computing device 700 to a network (such as connecting to recording unit 122). In embodiments suitable for use with human operators, computing device 700, as depicted in FIG. 7, may include peripheral adapter 706, which provides connectivity for the use of input device 708 and output device 709. Input device 708 may represent a device for user input, such as a keyboard or a mouse, or even a video camera. Output device 709 may represent a device for providing signals or indications to a user, such as loudspeakers for generating audio signals.

Computing device 700 is shown in FIG. 7 including display adapter 704 and further includes a display device or, more simply, a display 705. Display adapter 704 may interface shared bus 702, or another bus, with an output port for one or more displays, such as display 705. Display 705 may be implemented as a liquid crystal display screen, a computer monitor, a television or the like. Display 705 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display 705 may include an output device 709, such as one or more integrated speakers to play audio content, or may include an input device 708, such as a microphone or video camera.

Memory media 710 encompasses persistent and volatile media, fixed and removable media, and magnetic and semiconductor media. Memory media 710 is operable to store instructions, data, or both. Memory media 710 as shown includes sets or sequences of instructions 724-2, namely, an operating system 712 and actual position calculator 714. Operating system 712 may be a UNIX or UNIX-like operating system, a Windows® family operating system, or another suitable operating system. Instructions 724 may also reside, completely or at least partially, within processor 701 during execution thereof. It is further noted that processor 701 may be configured to receive instructions 724-1 from instructions 724-2 via shared bus 702. As shown, actual position calculator 714 may be configured to execute at least one of the first method, the second method, and the third method disclosed herein, or may be configured to execute at least certain portions of the first method, the second method, or the third method.

Figure 8:
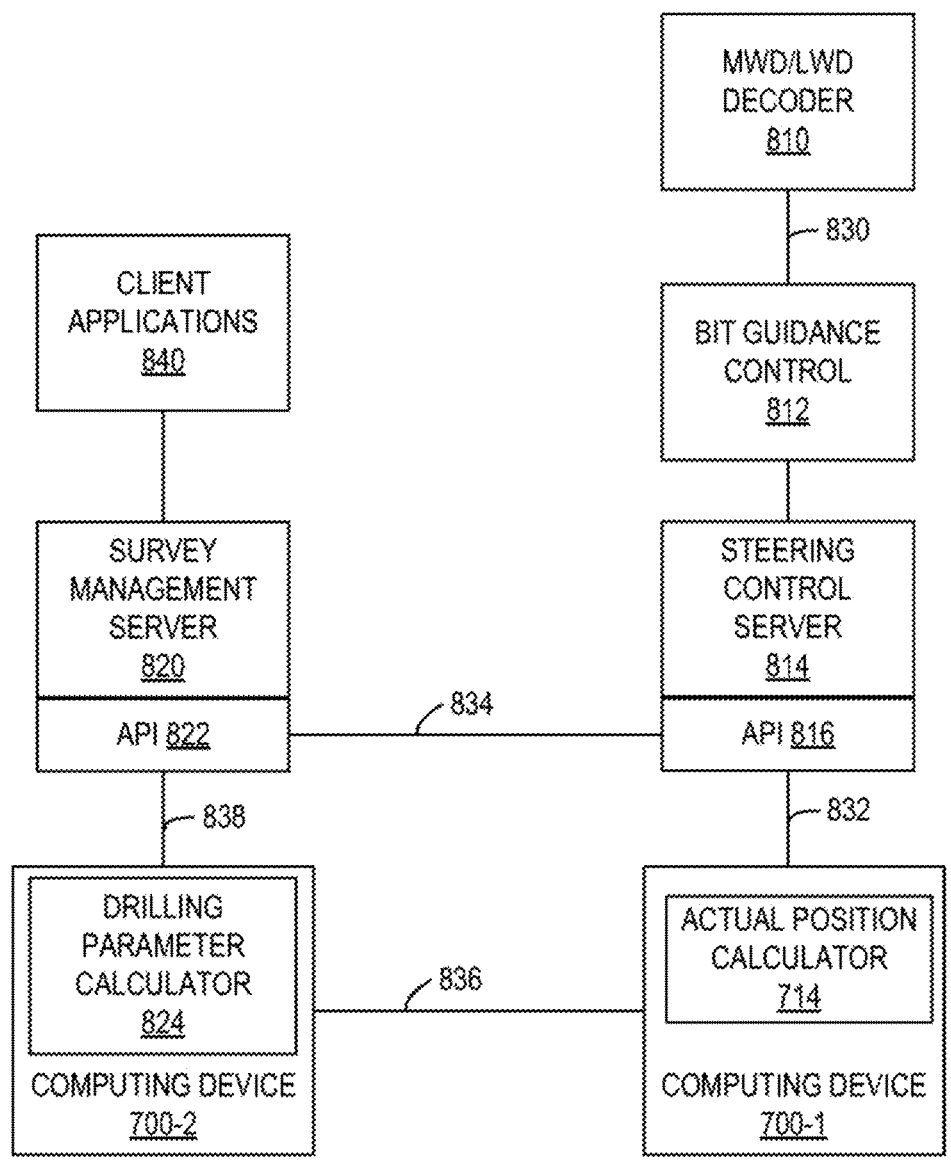
FIG. 8 illustrates a drilling system enabled to implement the methods disclosed herein.

Referring now to FIG. 8, a block diagram illustrates selected elements of an embodiment of a drilling system 800 for determining actual change in position and for controlling drilling operation on a drilling rig, such as in the drilling environment shown in FIG. 1. In FIG. 8, drilling system 800 is shown comprising a MWD/LWD decoder 810, a bit guidance control 812, a steering control server 814 having an application programming interface (API) 816, a computing device 700-1 executing actual position calculator 714, a computing device 700-2 executing a drilling parameter calculator 824, a survey management server 820 having an API 822, and at least one client application 840.

In operation of drilling system 800, at MWD/LWD decoder 810, measurement data may be collected using a downhole surveying tool, such as from MWD module 114 or LWD module 116. Interface 830 may represent a digital downhole interface, such as a Wellsite Information Transfer Specification (WITS) protocol. The measurement data may be transmitted to bit guidance control 812 and then to steering control server 814. The measurement data may be used in a variety of different formats, or may be translated into different formats. The measurement data may be accessed by actual position calculator 714 using API 816 that is native to steering control server 814. The measurement data transmitted via interface 832 may accordingly include stationary survey corrections and high resolution trajectory data, such as continuous measurements acquired using measurements section 112, for example. Via interface 836, the high resolution trajectory and corrected survey data may be transferred to drilling parameter calculator 824, which may represent executable instructions for converting the high resolution trajectory and corrected survey data into wellbore quality metrics, such as TVD corrections, tortuosity, rotary tendency, deflections, among other metrics. The wellbore quality metrics may be made accessible via interface 838 to survey management server 820 using correspondingly native API 822. Survey management server 820 may have a user portal that allows a user to view and manage survey data for various wells. Additionally, raw survey data and corrected surveys may be exchanged via interface 834 between API 822 and API 816. The corrected survey data may also be made accessible to various client applications 840, such as a directional driller application that enables control of rotary drilling and slide drilling, for example.

As disclosed herein, a system and method of drilling a wellbore to a target may include measuring attitudes at two adjacent survey stations along a wellbore using a downhole surveying tool. An actual change in wellbore position over a survey leg linking the two survey stations may be determined. Corrections may be applied to the measured attitude at one or both of the survey stations such that an estimated well path joining the survey stations indicates the determined actual change in wellbore position between the two survey stations.

While the invention has been described with respect to a limited number of embodiments, those skilled in the art of, having benefit of this disclosure, will appreciate that other embodiments can be devised which do not depart from the scope of the invention as disclosed herein. Accordingly, the scope of the invention should be limited only by the accompanying claims.

What is claimed is:

1. A system comprising:
   a non-transitory computer-readable medium; and
   a processor communicatively coupled to the non-transitory computer-readable medium, the processor configured to execute processor-executable instructions stored in the non-transitory computer-readable medium to:
   receive measured attitudes at two adjacent survey stations along a wellbore being drilled, wherein the attitudes are measured using a downhole surveying tool located in the wellbore;
   determine an actual change in wellbore position over a survey leg by linking the two adjacent survey stations with a first modeled well path;
   interpolate a notional survey station between the two adjacent survey stations, the interpolating comprising computing an attitude of the notional survey station such that a second modeled well path intersects the first modeled well path and the notional survey station, linking the two adjacent survey stations and the notional survey station reflecting the determined actual change in wellbore position over the survey leg; and
   responsive to the determined actual change in wellbore position, provide instructions to a drilling rig control system to control drilling of the wellbore beyond a second of the two adjacent survey stations.

2. The system of claim 1, wherein the instructions to determine the actual change in wellbore position further cause the processor to execute further processor-executable instructions stored in the non-transitory computer-readable medium to:
   determine the actual change using continuous survey measurements taken at least between the two adjacent survey stations during drilling of the wellbore.

3. The system of claim 1, wherein the instructions to determine the actual change in wellbore position further cause the processor to execute further processor-executable instructions stored in the non-transitory computer-readable medium to:
   determine the actual change using continuous inclination measurements taken at least between the two adjacent survey stations during drilling of the wellbore.

4. The system of claim 1, wherein the instructions to determine the actual change in wellbore position further cause the processor to execute further processor-executable instructions stored in the non-transitory computer-readable medium to:
   determine the actual change using depths and toolface directions defining slide intervals during drilling of the wellbore.

5. The system of claim 1, wherein the first modeled well path and the second modeled well path are circular arcs computed by a minimum curvature method.

6. The system of claim 1, wherein the instructions to determine the actual change in wellbore position further cause the processor to execute further processor-executable instructions stored in the non-transitory computer-readable medium to:
   calculating at least one drilling parameter based on the two adjacent survey stations; and
   provide instructions to the drilling rig control system to control drilling of the wellbore using the at least one drilling parameter calculated.

7. A non-transitory computer-readable medium comprising processor-executable instructions configured to cause one or more processors to:
   receive measured attitudes at two adjacent survey stations along a wellbore being drilled, wherein the attitudes are measured using a downhole surveying tool located in the wellbore;
   determine an actual change in wellbore position over a survey leg by linking the two adjacent survey stations with a first modeled well path; interpolate a notional survey station between the two adjacent survey stations, the
   interpolating comprising computing an attitude of the notional survey station such that a second modeled well path intersects the first modeled well path and the notional survey station, linking the two adjacent survey stations and the notional survey station reflecting the determined actual change in wellbore position over the survey leg; and
   responsive to the determined actual change in wellbore position, provide instructions to a drilling rig control system to control drilling of the wellbore beyond a second of the two adjacent survey stations.

8. The non-transitory computer-readable medium of claim 7, wherein the instructions to determine the actual change in wellbore position further cause the one or more processors to execute further processor-executable instructions stored in the non-transitory computer-readable medium to:
   determine the actual change using continuous survey measurements taken at least between the two adjacent survey stations during drilling of the wellbore.

9. The non-transitory computer-readable medium of claim 7, wherein the instructions to determine the actual change in wellbore position further cause the one or more processors to execute further processor-executable instructions stored in the non-transitory computer-readable medium to:
   determine the actual change using continuous inclination measurements taken at least between the two adjacent survey stations during drilling of the wellbore.

10. The non-transitory computer-readable medium of claim 7, wherein the instructions to determine the actual change in wellbore position further cause the one or more processors to execute further processor-executable instructions stored in the non-transitory computer-readable medium to:
    determine the actual change using depths and toolface directions defining slide intervals during drilling of the wellbore.

11. The non-transitory computer-readable medium of claim 7, wherein the first modeled well path and the second modeled well path are circular arcs computed by a minimum curvature method.

12. The non-transitory computer-readable medium of claim 7, wherein the instructions to determine the actual change in wellbore position further cause the one or more processors to execute further processor-executable instructions stored in the non-transitory computer-readable medium to:
  calculate at least one drilling parameter based on the two adjacent survey stations; and
  provide instructions to the drilling rig control system to control drilling of the wellbore using the at least one drilling parameter calculated.

\* \* \* \* \*